United States Patent
Ghike et al.

(10) Patent No.: US 8,413,437 B2
(45) Date of Patent: Apr. 9, 2013

(54) TRANSMISSION HYDRAULIC CONTROL SYSTEM HAVING INDEPENDENTLY CONTROLLED STATOR COOLING FLOW

(75) Inventors: Chinar S. Ghike, Livonia, MI (US); James D. Hendrickson, Belleville, MI (US); Zhe Xie, Auburn Hills, MI (US); Terry Johnecheck, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 791 days.

(21) Appl. No.: 12/633,513

(22) Filed: Dec. 8, 2009

(65) Prior Publication Data

US 2011/0131969 A1 Jun. 9, 2011

(51) Int. Cl.
*F16D 31/02* (2006.01)
*F15B 13/04* (2006.01)

(52) U.S. Cl.
USPC .................. 60/422; 60/456; 91/444

(58) Field of Classification Search .............. 60/420, 60/422, 426, 456; 91/444, 532
See application file for complete search history.

(56) References Cited

U.S. PATENT DOCUMENTS

| | | | |
|---|---|---|---|
| 4,653,352 A | 3/1987 | Nakao et al. | |
| 4,944,202 A | 7/1990 | Gierer | |
| 5,441,459 A | 8/1995 | Inukai et al. | |
| 6,361,287 B1 | 3/2002 | Hopper | |
| 6,715,597 B1 | 4/2004 | Buchanan et al. | |
| 7,300,375 B2 | 11/2007 | Petrzik | |
| 7,487,866 B2 | 2/2009 | Kruse et al. | |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2004/0038765 A1 | 2/2004 | Fujimine et al. | |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2009/0151495 A1 | 6/2009 | Garabello et al. | |
| 2009/0157271 A1 | 6/2009 | Garabello et al. | |

FOREIGN PATENT DOCUMENTS

| | | |
|---|---|---|
| DE | 2141564 A1 | 2/1973 |
| DE | 4117736 C1 | 5/1992 |
| DE | 4320353 A1 | 1/1994 |
| DE | 19637001 A1 | 3/1997 |
| DE | 29714652 U1 | 10/1997 |
| DE | 19813982 A1 | 10/1999 |
| DE | 19921301 A1 | 11/1999 |
| DE | 19849488 A1 | 5/2000 |
| DE | 19857222 A1 | 6/2000 |
| DE | 19931973 A1 | 1/2001 |
| DE | 10147123 A1 | 4/2002 |
| DE | 10134115 A1 | 1/2003 |

(Continued)

*Primary Examiner* — Michael Leslie (57) ABSTRACT

A hydraulic control system includes a source of pressurized hydraulic fluid for providing a pressurized hydraulic fluid, a main line circuit in fluid communication with the source of pressurized hydraulic fluid, a regulation valve in communication with the source of pressurized hydraulic fluid, the regulation valve moveable between a plurality of positions, and a lubrication valve in communication with the regulation valve, the lubrication valve moveable between a plurality of positions. A lubrication circuit and a cooling circuit are in communication with the lubrication valve. The regulation valve allows pressurized hydraulic fluid to communicate with the lubrication valve after the main line circuit is saturated, the lubrication valve allows fluid communication between the regulation valve and the lubrication circuit until the lubrication circuit is saturated, and the lubrication valve allows fluid communication between the regulation valve and the cooling circuit and the lubrication circuit after the lubrication circuit is saturated.

20 Claims, 6 Drawing Sheets

FOREIGN PATENT DOCUMENTS

| | | | |
|---|---|---|---|
| DE | 10243282 A1 | 4/2004 |
| DE | 10327406 A1 | 2/2005 |
| DE | 102004001753 A1 | 8/2005 |
| DE | 102005006431 A1 | 8/2006 |
| DE | 102005029963 A1 | 2/2007 |
| DE | 102005029964 A1 | 3/2007 |
| EP | 0157086 A1 | 10/1985 |
| EP | 0475488 A1 | 3/1992 |
| EP | 0477564 A2 | 4/1992 |
| EP | 0933564 A2 | 8/1999 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

TRANSMISSION HYDRAULIC CONTROL SYSTEM HAVING INDEPENDENTLY CONTROLLED STATOR COOLING FLOW

FIELD

The present disclosure relates to a transmission hydraulic control system having a cooling flow of hydraulic fluid to a stator that is independently controlled from a lubrication flow and a line pressure flow.

BACKGROUND

The statements in this section merely provide background information related to the present disclosure and may or may not constitute prior art.

A typical automatic transmission in a motor vehicle includes a hydraulic control system that is employed to actuate a plurality of torque transmitting devices as well as provide cooling and lubrication to the components of the transmission. These torque transmitting devices may be, for example, friction clutches and brakes. The conventional hydraulic control system typically includes a main pump that provides a pressurized fluid, such as oil, to a plurality of valves and solenoids within a valve body. The main pump can be driven by the prime mover of the motor vehicle or an auxiliary electric motor.

Hybrid automatic transmissions include an electric motor/generator that includes a rotator and stator is used to generate electricity and to act as an auxiliary source of power when the prime mover is inoperative. The stator of the electric motor/generator typically requires cooling, and the hydraulic control system is typically configured to provide a flow of stator cooling hydraulic fluid. Simultaneously, the hydraulic control system must provide a required line pressure to a line pressure circuit used, for example, to control torque transmitting devices and a required pressure to a lubrication circuit used to lubricate the components of the transmission. However, the amount of stator cooling flow required varies and is a lower priority than providing the necessary fluid pressures to the line pressure circuit and the lubrication circuit. While existing hydraulic control systems are effective for providing stator cooling flow, they require sufficient pump power to provide fluid flow to all three circuits. Accordingly, there is room in the art for a hydraulic control system that prioritizes the flow of hydraulic fluid to the line circuit, the lubrication circuit, and finally the stator cooling circuit while minimizing valve and solenoid controls as well as minimizing pump power consumption in order to improve the motor vehicle's fuel economy.

SUMMARY

A hydraulic control system in a transmission is provided. The hydraulic control system includes a source of pressurized hydraulic fluid for providing a pressurized hydraulic fluid, a main line circuit in fluid communication with the source of pressurized hydraulic fluid, a regulation valve in fluid communication with the source of pressurized hydraulic fluid, the regulation valve moveable between a plurality of positions, and a lubrication valve in fluid communication with the regulation valve, the lubrication valve moveable between a plurality of positions. A lubrication circuit is in fluid communication with the lubrication valve and a cooling circuit is in fluid communication with the lubrication valve. The regulation valve allows pressurized hydraulic fluid to communicate with the lubrication valve after the main line circuit is saturated with pressurized hydraulic fluid, the lubrication valve allows fluid communication between the regulation valve and the lubrication circuit until the lubrication circuit is saturated, and the lubrication valve allows fluid communication between the regulation valve and the cooling circuit and the lubrication circuit after the lubrication circuit is saturated.

In one example of the hydraulic control system, the source of pressurized hydraulic fluid is an electric pump.

In another example of the hydraulic control system, when lubrication circuit is saturated with hydraulic fluid, the flow of the hydraulic fluid to the cooling circuit is controlled by a speed of the electric pump and the flow of the hydraulic fluid to the lubrication circuit is constant and is controlled by the lubrication valve.

In yet another example of the hydraulic control system, the cooling circuit is in communication with a stator of the transmission.

In yet another example of the hydraulic control system, the regulation valve allows regulated hydraulic fluid flow to communicate to the source of pressurized hydraulic fluid when the cooling circuit is saturated with hydraulic fluid.

In yet another example of the hydraulic control system, a solenoid is in operative association with the regulation valve and the lubrication valve, wherein the solenoid is operable to bias the regulation valve to a position that prevents fluid communication between the regulation valve and the lubrication valve, and wherein the solenoid is operable to bias the lubrication valve to a position that allows fluid communication between the regulation valve and the lubrication circuit and prevents fluid communication between the regulation valve and the cooling circuit.

In yet another example of the hydraulic control system, the regulation valve and the lubrication valve are each biased by a biasing member in the same direction as the solenoid.

In yet another example of the hydraulic control system, the regulation valve is moved after the main line circuit is saturated by pressurized hydraulic fluid by pressurized hydraulic fluid from the source of pressurized hydraulic fluid acting on the regulation valve against the bias of the solenoid and the biasing member.

In yet another example of the hydraulic control system, the lubrication valve is moved after the lubrication circuit is saturated by pressurized hydraulic fluid by pressurized hydraulic fluid acting on the lubrication valve against the bias of the solenoid and the biasing member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
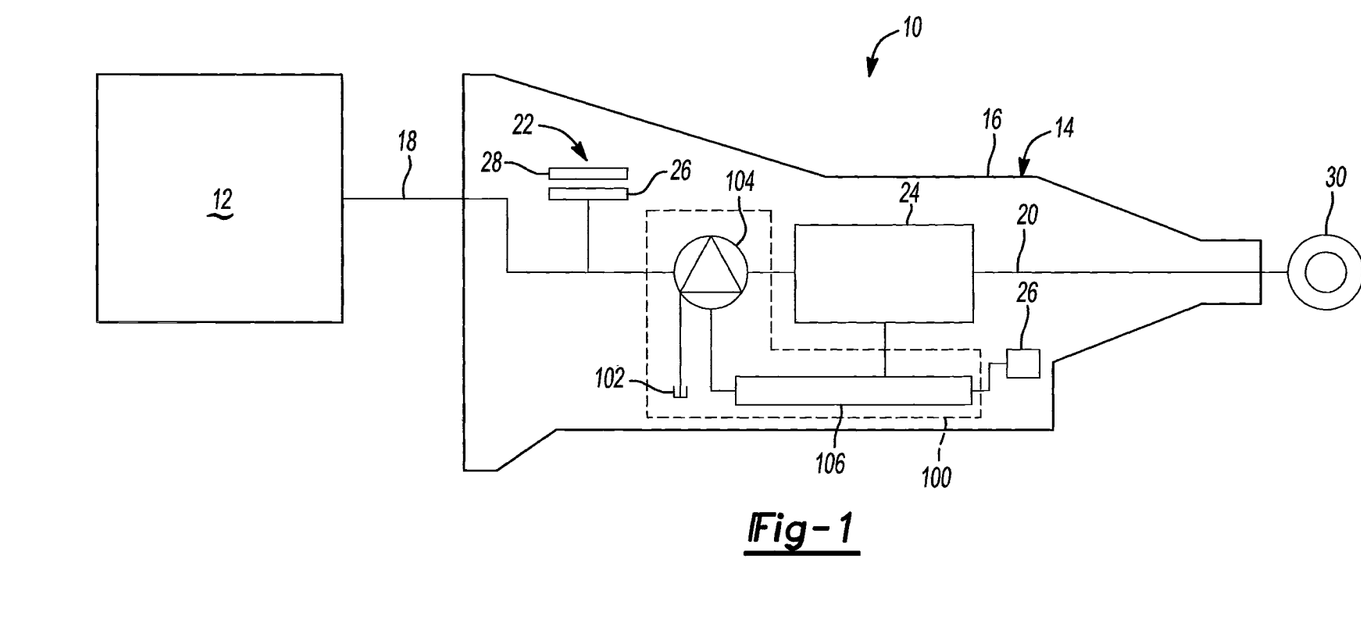
FIG. 1 is a schematic view of an exemplary powertrain according to the present invention.

With reference to FIG. 1, an exemplary powertrain is generally indicated by reference number 10. The powertrain includes an engine 12 connected to a hybrid transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the hybrid transmission 14 without departing from the scope of the present disclosure. The engine 12 supplies a driving torque to the hybrid transmission 14.

The hybrid transmission 14 includes a typically cast, metal housing 16 which encloses and protects the various components of the hybrid transmission 14. The housing 16 includes a variety of apertures, passageways, shoulders and flanges which position and support these components. The hybrid transmission 14 includes an input shaft 18, an output shaft 20, at least one electric motor/generator 22, and a gear and clutch arrangement 24. It should be appreciated that while the hybrid transmission 14 is illustrated schematically as a rear wheel drive transmission, the transmission 14 may have other configurations without departing from the scope of the present disclosure. The input shaft 18 is connected with the engine 12 and receives input torque or power from the engine 12. The electric motor/generator includes a rotor 26 and a stator 28 and is operable to act as both a generator for storing power and as a motor for providing power. The hybrid transmission 14 may include a one way clutch or other device between the engine 12 and the electric motor/generator 22 without departing from the scope of the present invention. The input shaft 18 is coupled to and provides drive torque to the gear and clutch arrangement 24.

The gear and clutch arrangement 24 generally include gear sets, shafts, and torque transmitting devices. The gear sets may include individual intermeshing gears, such as planetary gear sets, that are connected to or selectively connectable to the plurality of shafts. The shafts may include layshafts or countershafts, sleeve and center shafts, interconnecting shafts or members, reverse or idler shafts, or combinations thereof. The torque transmitting devices are selectively engageable, singly or in combination, to initiate a plurality of forward and reverse gear or speed ratios by selectively coupling individual gears within the plurality of gear sets to the plurality of shafts. The torque transmitting devices may be any type of clutch or brake, including dry dual clutches, wet clutches, band clutches, one-way clutches, etc., and synchronizer assemblies without departing from the scope of the present invention. It should be appreciated that the specific arrangement and number of the gear sets and torque transmitting devices and the specific arrangement and number of the shafts within the transmission 14 may vary without departing from the scope of the present invention. The gear and clutch arrangement 24 is connected to the output shaft 20. The output shaft 20 is preferably connected with a final drive unit 30 which may include, for example, propshafts, differential assemblies, and drive axles.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanism 24 via a hydraulic control system 100 according to the principles of the present disclosure.

The hydraulic control system 100 is operable to selectively actuate components within the hybrid transmission 14 including the torque transmitting devices within the gear and clutch arrangement 24, to provide lubrication to the various components of the hybrid transmission 14, and to provide cooling to various components within the hybrid transmission 14 including the stator 28. The hydraulic fluid used to actuate, lubricate, and cool is communicated from a sump 102 under pressure via an electric pump 104 that is driven by an independent electric motor/generator. The pump 104 may be of various types, for example, a gear pump, a vane pump, a gerotor pump, or any other positive displacement pump. A valve body 106 having a plurality of valves, solenoids, fluid channels, and other control devices selectively communicates the hydraulic fluid from the pump 104 to the various components of the hybrid transmission 14.

Figure 2:
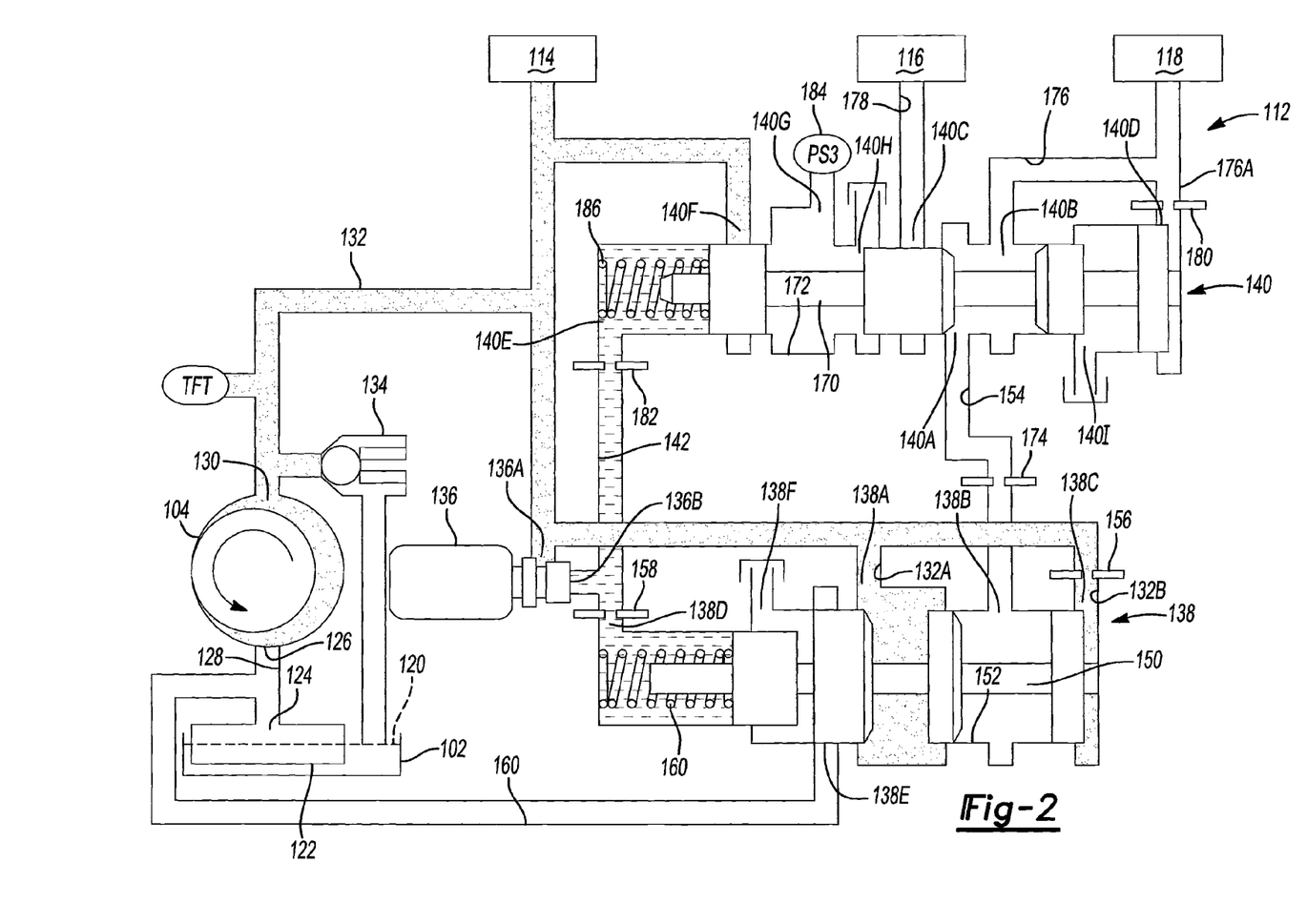
FIG. 2 is a schematic diagram of a hydraulic control system according to the principles of the present disclosure in a first mode of operation.

Turning to FIG. 2, a circuit or subsystem of the hydraulic control system 100 is illustrated in more detail and generally indicated by reference number 112. The circuit 112 operates as the source of pressurized hydraulic fluid for other circuits or subsystems within the hydraulic control system 100 including a main line circuit 114, a stator cooling circuit 116, and a lubrication circuit 118. The main line circuit 114 carries a line pressure hydraulic fluid from the pump 104 to various other circuits and subsystems in the hydraulic control system 100 including, for example, torque transmitting device actuator subsystems, torque converter clutch subsystems, compensators subsystems, etc. The line pressure is the pressure of the hydraulic fluid delivered from the pump 104 that is regulated by a regulation valve. The stator cooling circuit 116 is a hydraulic circuit that delivers hydraulic fluid to the stator 28 of the electric motor/generator 22 to provide cooling. Where the transmission 14 includes more than one motor/generator 22, the stator cooling circuit 116 provides hydraulic fluid to all the stators within the electric motor/generators. The lubrication circuit 118 is a hydraulic circuit that delivers hydraulic fluid to various components throughout the hybrid transmission 14 to provide lubrication. It should be appreciated that the hydraulic control system 100 may include various other subsystems and circuits that perform various functions within the hybrid transmission 14 without departing from the scope of the present invention.

The subsystem 112 includes the pump 104, as described above, and the sump 102. The sump 102 is a fluid reservoir, typically located at a bottom of the hybrid transmission 14, which is operable to store a hydraulic fluid 120. The sump 102 includes a sump filter 122 having an outlet port 124.

The hydraulic fluid 120 is forced from the sump 102 by the pump 104 and is communicated from the outlet port 124 of the sump 102 to an inlet port 126 of the pump via a suction line 128. An outlet port 130 of the pump 104 communicates the line pressure hydraulic fluid 120 to a supply line 132. The supply line 132 communicates the line pressure hydraulic fluid 120 to the main line circuit 114. The supply line 132 is also in communication with a spring biased blow-off safety valve 134, a control device 136, a pressure regulation valve assembly 138, and a lubrication regulation valve assembly 140.

The spring biased blow-off safety valve 134 communicates with the sump 102. The spring biased blow-off safety valve 134 is set at a relatively high predetermined pressure and if the pressure of the hydraulic fluid 120 in the supply line 132 exceeds this pressure, the safety valve 134 opens momentarily to relieve and reduce the pressure of the hydraulic fluid 120.

The control device 136 is preferably a low flow variable force solenoid that is normally open. However, it should be appreciated that other types of solenoids and other control devices may be employed without departing from the scope of the present invention. The control device 136 includes an inlet port 136A in fluid communication with the supply line 132 and an outlet port 136B in fluid communication with a control line 142. The control device 136 is electrically actuated by the controller 26 to regulate the pressure at the outlet port 136B by moving between open states and a closed state. In the closed state, the inlet port 136A is prevented from communicating with the outlet port 136B. In the open states, the inlet port 136A is allowed to communicate fully or partially with the outlet port 136B in order to regulate the pressure of the hydraulic fluid at the outlet port 136B. The control device 136 is operable to actuate the pressure regulation valve assembly 138 and the lubrication regulation valve assembly 140 by communicating pressurized hydraulic fluid 120 to the valve assemblies 138, 140 via the control line 142. However, it should be appreciated that the pressure regulation valve assembly 138 and the lubrication valve assembly 140 may be actuated by separately connected solenoids or any other source of pressurized hydraulic fluid.

The pressure regulation valve assembly 138 is operable to regulate the flow of line pressure hydraulic fluid 120 from the supply line 132 to the lubrication regulation valve assembly 140. The pressure regulation valve assembly 138 includes a spool valve 150 slidably disposed within a bore 152. The regulation valve assembly 138 includes an inlet port 138A, an outlet port 138B, a feedback port 138C, a control port 138D, a pump return port 138E, and an exhaust port 138F that each communicate with the bore 152. It should be appreciated that the regulation valve 138 may have various other ports and configurations without departing from the scope of the present invention. The inlet port 138A is in fluid communication with a branch 132A of the main supply line 132. The outlet port 138B is in fluid communication with an intermediate line 154. The feedback port 138C is in fluid communication with a branch 132B of the supply line 132 via a flow restriction orifice 156. The control port 138D is in fluid communication with the control line 142 via a fluid restriction orifice 158. The pump return port 138E is in fluid communication with a suction return line 160 that communicates with the suction line 128. Finally, the exhaust port 138F is in fluid communication with the sump 102.

Figure 3:
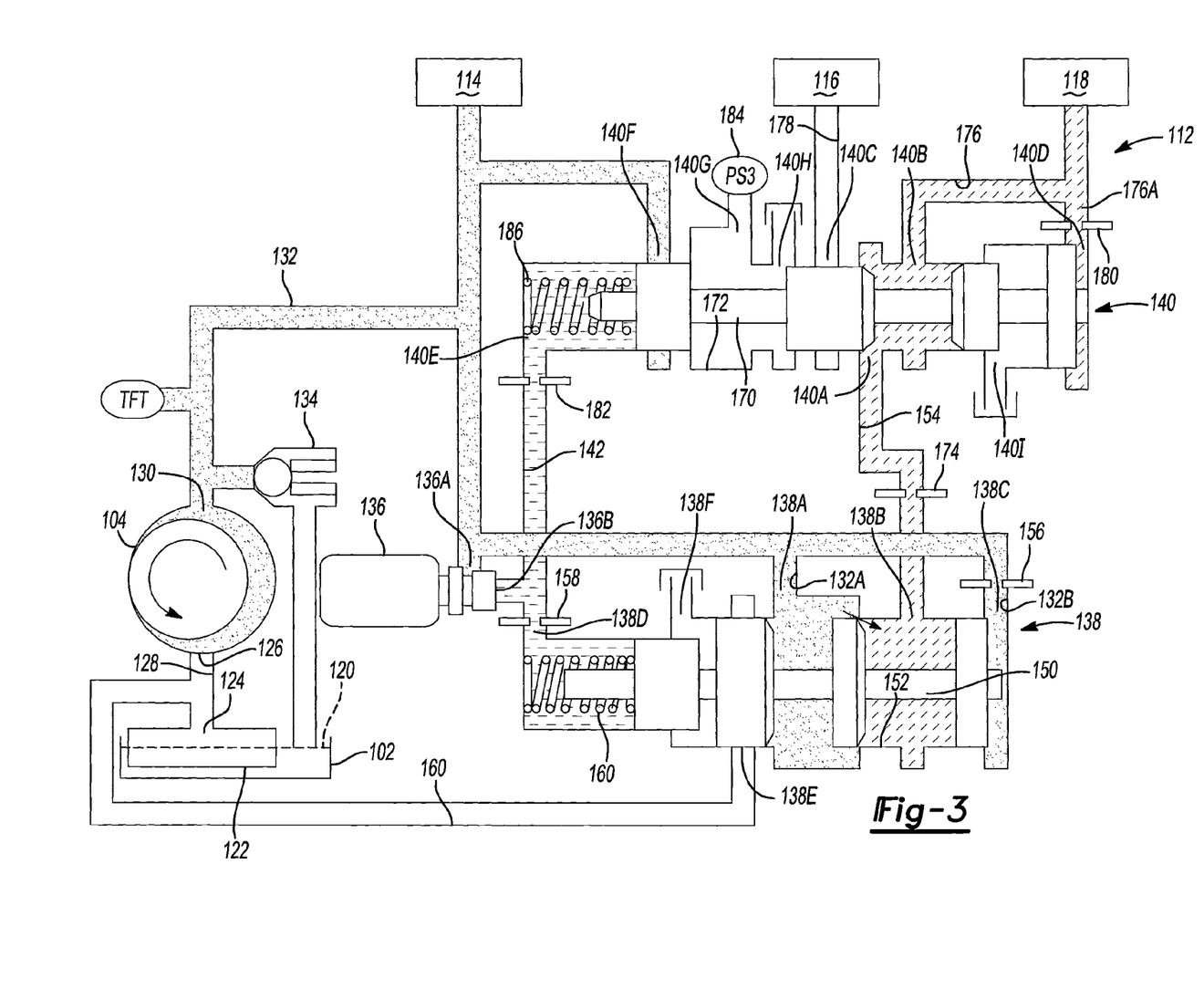
FIG. 3 is a schematic diagram of the hydraulic control system according to the principles of the present disclosure in a second mode of operation.
Figure 4:
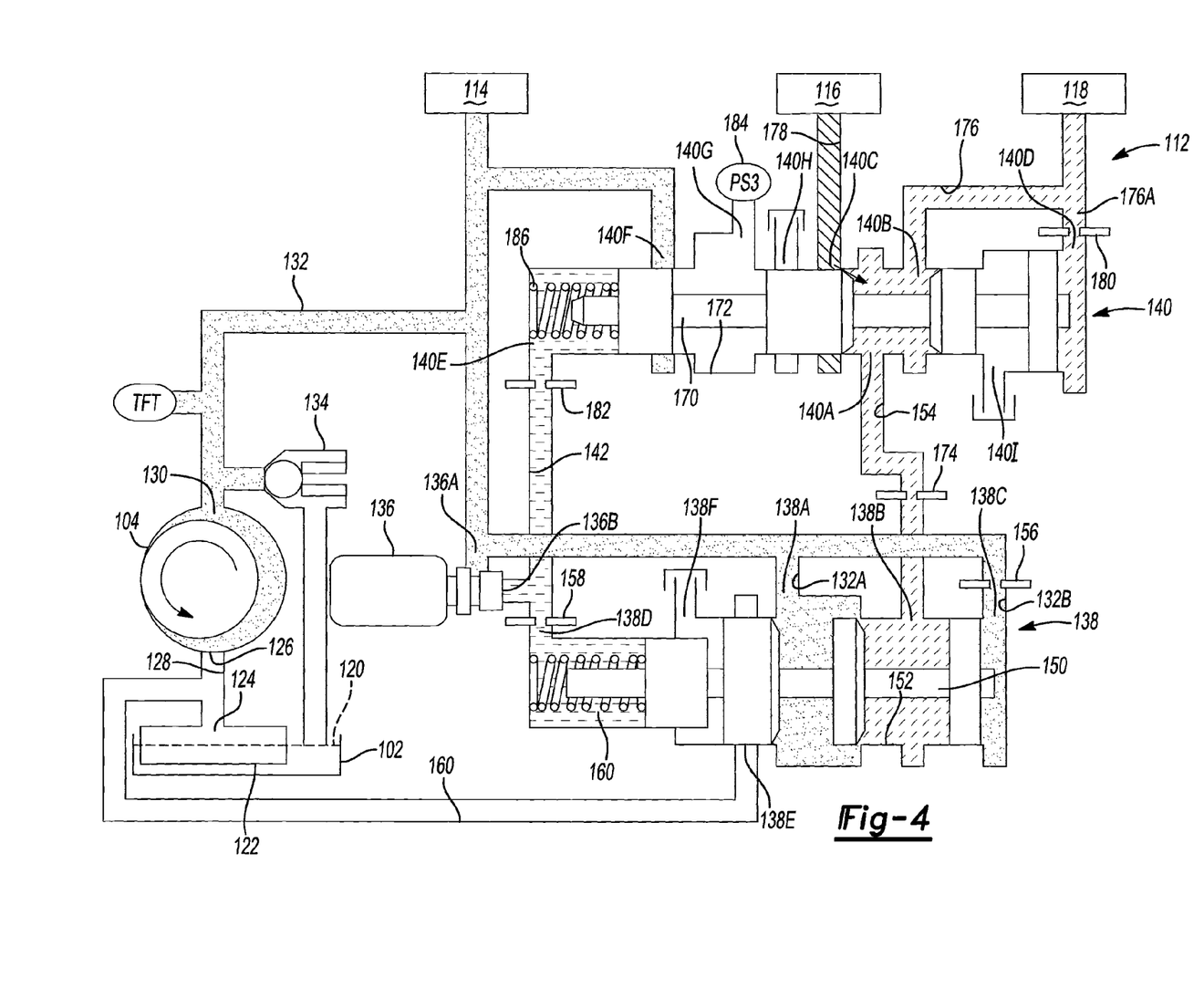
FIG. 4 is a schematic diagram of the hydraulic control system according to the principles of the present disclosure in a third mode of operation.
Figure 5:
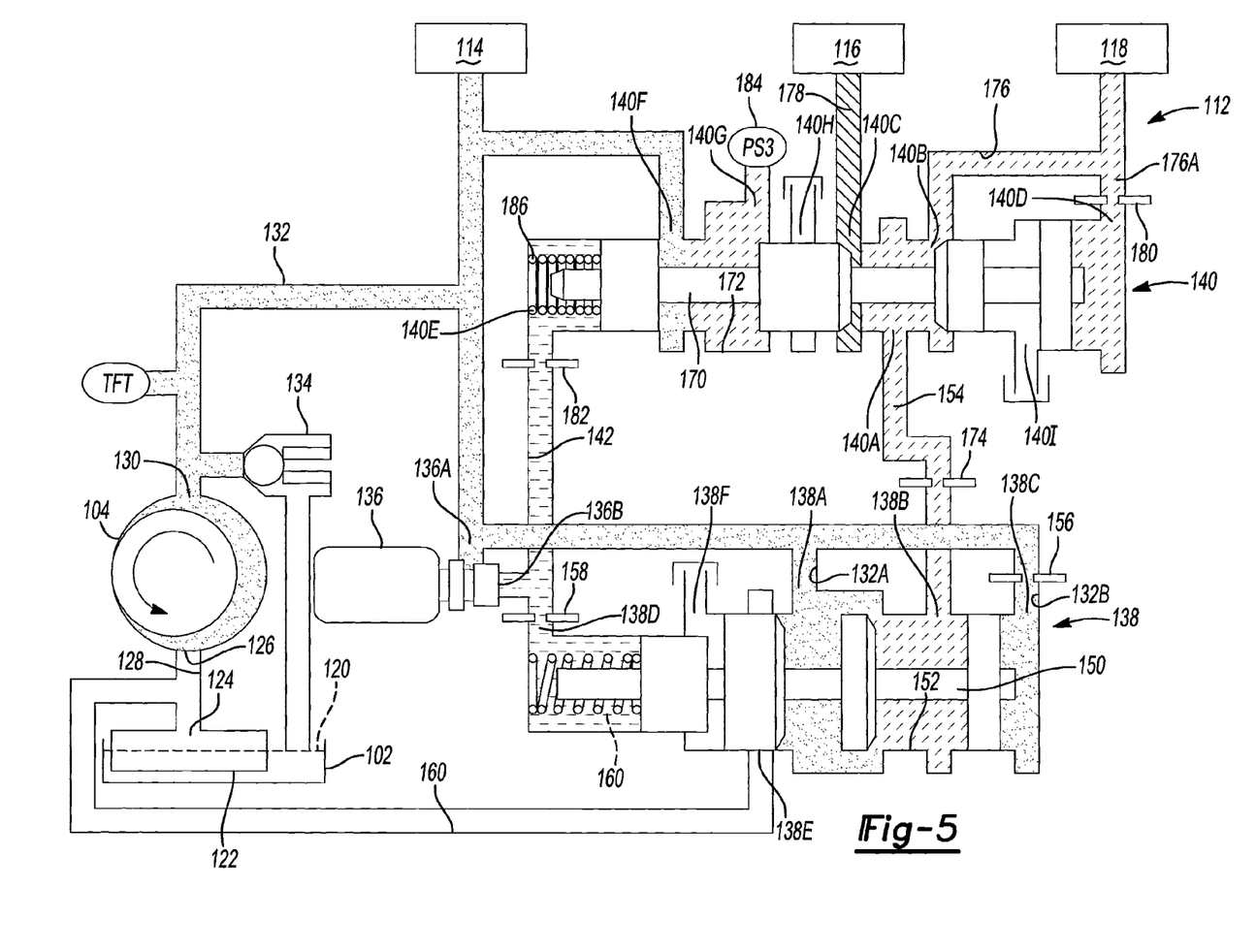
FIG. 5 is a schematic diagram of the hydraulic control system according to the principles of the present disclosure in a fourth mode of operation.
Figure 6:
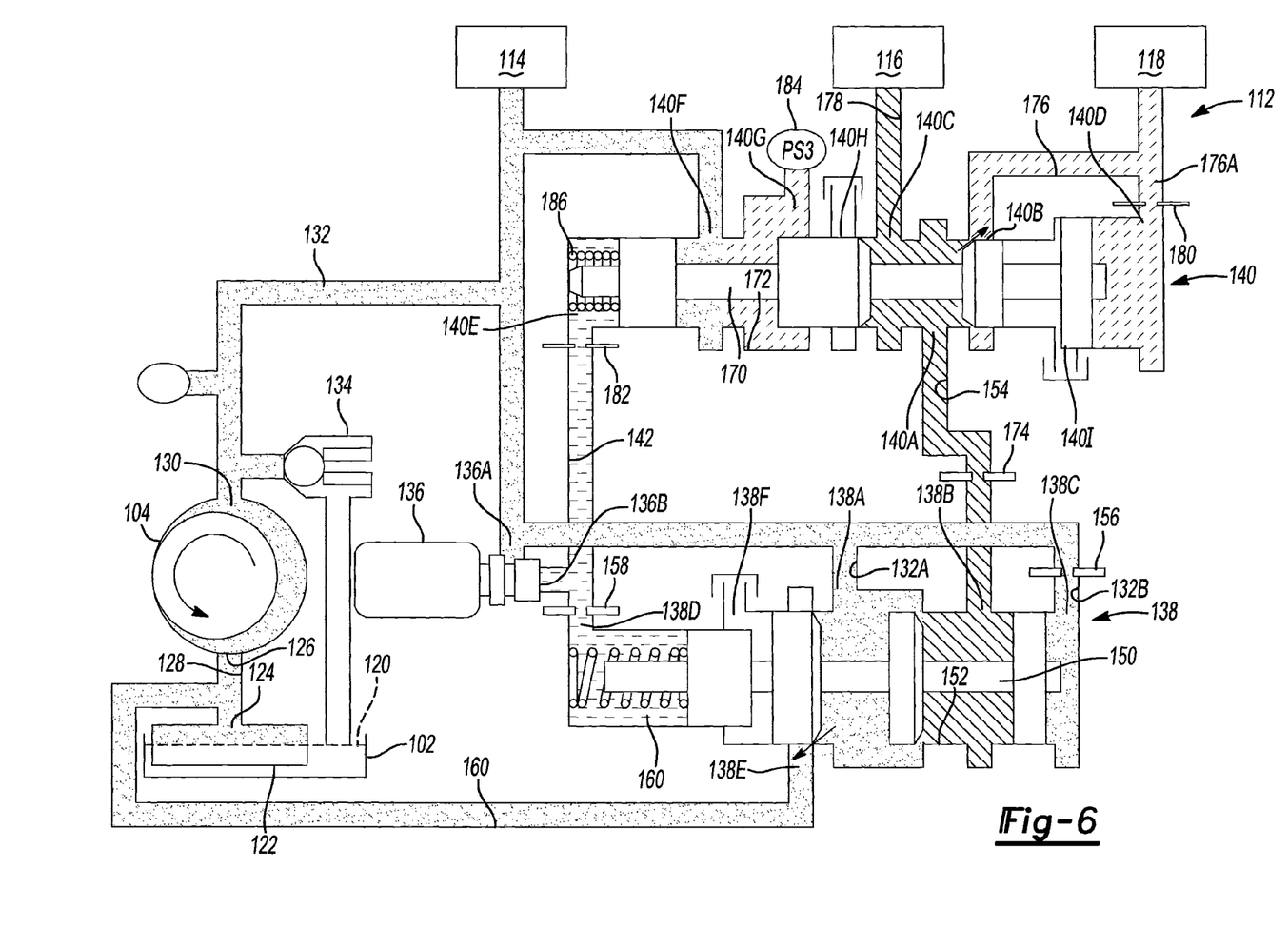
FIG. 6 is a schematic diagram of the hydraulic control system according to the principles of the present disclosure in a fifth mode of operation.

The valve 150 is moveable between various positions including a de-stroked or first position shown in FIG. 2, a cracked or second position shown in FIG. 3, a regulated or third position shown in FIGS. 4 and 5, and a bleed or fourth position shown in FIG. 6. In the example provided, the valve 150 is moved to the de-stroked position by a biasing member or spring 160 located at an end of the valve 150 and when the control device 136 is in the open state. However, other methods of biasing the valve 150 may be employed so long as a force acting on the valve 150 moves the valve 150 to a de-stroked position. When the valve 150 is in the de-stroked position, the inlet port 138A is isolated from the outlet port 138B. When the valve 150 is in the cracked position, the inlet port 138A is in partial fluid communication with the outlet port 138B, thereby allowing a flow of hydraulic fluid to exit the output port 138B. When the valve 150 is in the regulated position the inlet port 138A is in regulated fluid communication with the outlet port 138B, resulting in a regulated flow of hydraulic fluid exiting the outlet port 138B. When the valve 150 is in the bleed position, the inlet port 138A is in fluid communication with the outlet port 138B and in partial fluid communication with the pump return port 138E.

The lubrication regulation valve assembly 140 is operable to regulate the flow of hydraulic fluid 120 from the intermediate line 154 to the lubrication circuit 118 and the stator cooling circuit 116. The lubrication regulation valve assembly 140 includes a spool valve 170 slidably disposed within a bore 172. The lubrication valve assembly 140 includes an inlet port 140A, a lubrication outlet port 140B, a cooling outlet port 140C, a feedback port 140D, a control port 140E, a main line port 140F, a pressure sensor feed port 140G, and a pair of exhaust ports 140H and 140I. It should be appreciated that the lubrication valve 140 may have various other ports and configurations without departing from the scope of the present invention. The inlet port 140A is in fluid communication with the intermediate line 154 via a flow restriction orifice 174. The lubrication outlet port 140B is in fluid communication with a lubrication feed line 176 that communicates with the lubrication circuit 118. The cooling outlet port 140C is in fluid communication with a cooling feed line 178 that communicates with the stator cooling circuit 116. The feedback port 140D is in fluid communication with a branch 176A of the lubrication feed line 176 via a flow restriction orifice 180. The control port 140E is in fluid communication with the control line 142 via a fluid restriction orifice 182. The main line port 140F is in fluid communication with the supply line 132. The pressure sensor feed port 140G is in fluid communication with a pressure switch 184. Finally, the exhaust ports 140H and 140I are each in fluid communication with the sump 102.

The valve 170 is moveable between various positions including a de-stroked or first position shown in FIGS. 2 and 3, a cracked or second position shown in FIG. 4, a regulated or third position shown in FIG. 5, and a balanced position shown in FIG. 6. In the example provided, the valve 170 is moved to the de-stroked position by a biasing member or spring 186 located at an end of the valve 170 and when the control device 136 is in the open state. However, other methods of biasing the valve 150 may be employed so long as a force acting on the valve 150 moves the valve 150 to a de-stroked position. When the valve 170 is in the de-stroked position, the inlet port 140A is in communication with lubrication outlet port 140B. When the valve 170 is in the cracked position, the inlet port 140A is in partial fluid communication with the cooling outlet port 140C and in fluid communication with the lubrication outlet port 140B. In addition, the main line port 140F is in partial fluid communication with the sensor feed port 140G. When the valve 170 is in the regulated position the inlet port 140A is in regulated fluid communication with the lubrication outlet port 140B, resulting in a regulated flow of hydraulic fluid exiting the outlet port 140B, and the inlet port 140A is in full communication with the cooling outlet port 140C. In addition, the main line port 140F is in full communication with the sensor feed port 140G. When the valve 170 is in the balanced position, the inlet port 140A is in fluid communication with the lubrication outlet port 140B and the cooling outlet port 140C.

Beginning with FIG. 2, the operation of the subsystem 112 will now be described in detail. The subsystem 112 is operable to provide hydraulic fluid 120 to the main line circuit 114 as a first priority, to the lubrication circuit 118 as a second priority, and to the stator cooling circuit 116 as a third priority. For example, during pump 104 start (i.e. as the speed of the pump 104 increases), main line hydraulic fluid 120 is communicated directly to the supply line 132 and to the main line circuit 114. The pressure regulation valve 138 is in the de-stroked position due to the basing member 160 and the open control device 136. Again, other methods and mechanisms for placing the pressure regulation valve 138 may be employed without departing from the scope of the present invention. The pressure regulation valve 138 cuts off hydraulic fluid flow to the lubrication regulation valve 140 and therefore the stator cooling and lubrication circuits 116 and 118. Accordingly, during pump 104 start, the subsystem 112 assures that the main line circuit 114 is the first priority and receives all the output from the pump 104.

Turning to FIG. 3, once the main line circuit 114 becomes saturated with main line hydraulic fluid 120 (i.e. the main line circuit 114 is filled with hydraulic fluid), pressure begins to build via the feedback port 138C within the pressure regulation valve assembly 138 at an end of the valve 150 opposite the biasing member 160 and the fluid delivered from control device 136. Accordingly, the valve 150 moves to the cracked position and hydraulic fluid 120 begins to flow from the inlet port 138A to the output port 138B. This rate of flow increases over time to a peak value as the valve 150 continues to move as will be discussed below. The hydraulic fluid 120 enters the lubrication regulation valve assembly 140, which is in the de-stroked position. Accordingly, the hydraulic fluid flow from the pressure regulation valve assembly 138 is completely diverted to the lubrication outlet port 140B, and then to the lubrication circuit 118 via the lubrication feed line 176. This assures that the lubrication circuit 118 receives the flow of hydraulic fluid before the stator cooling circuit 116 but after the main line circuit 114.

Turning to FIG. 4, as the pressure acting on the valve 150 increases via the feedback port 138C due to increasing speed of the pump 104, the valve 150 continues to stroke and the rate of flow from the inlet port 138A to the outlet port 138B increases. As the rate of flow of hydraulic fluid 120 increases to the lubrication regulation valve assembly 140, the lubrication circuit 118 eventually becomes saturated (i.e. the lubrication circuit 118 is filled with hydraulic fluid) and pressure begins to build via the feedback port 140D within the lubrication regulation valve assembly 140 at an end of the valve 170 opposite the biasing member 186 and the fluid delivered from control device 136. Accordingly, the valve 170 moves to the cracked position and hydraulic fluid 120 begins to flow from the inlet port 140A to the cooling output port 140C. At this point, the pressure of the hydraulic fluid 120 at the feedback port 140D is substantially constant.

Turning to FIG. 5, the valve 170 moves to the regulated position as the speed of the pump 104 increases and the flow and pressure of the hydraulic fluid 120 within the lubrication circuit 118 is substantially steady. However, the cooling outlet port 140C is in full fluid communication with the inlet port 140A and the flow and pressure within the cooling circuit 116 increases as the pump 104 speed increases. Accordingly, the stator cooling circuit 116 can be directly controlled by the pump 104 speed independently of the lubrication circuit 118 once the lubrication circuit 118 has been saturated. This assures that the cooling circuit 116 receives the flow of hydraulic fluid 120 after the main line circuit 114 and the lubrication circuit 118.

With reference to FIG. 6, once the cooling circuit 116 becomes saturated, pressure may back up within the supply line 132. Accordingly, if the back pressure acting on the pressure regulation valve assembly 138 via the feedback port 138C exceeds a threshold, the valve 150 moves to the bypass position. Accordingly, hydraulic fluid 120 is diverted from the inlet port 138A to the pump return port 138E, thereby reducing the pressure within the supply line 132.

The subsystem 112 allows the pressure and flow of hydraulic fluid 120 to the lubrication circuit 118 to be regulated as a function of the main line pressure while also regulate the pressure and flow of hydraulic fluid 120 to the stator cooling circuit 116 as a function of pump 104 speed. Accordingly, high flows of hydraulic fluid 120 to the stator cooling circuit 116 is achieved without increasing main line pressure and with low lubrication flow/pressure. The risk of excessive hydraulic fluid spin losses and/or the risk of line pressure spikes in the case of pump over-speed are also eliminated due to the ability of the regulation valve 138 to return excess hydraulic fluid back to the suction line 128 of the pump 104. In addition, the position of the lubrication regulation valve assembly 140 can be tracked based on the pressure of the hydraulic fluid via main line port 140F that is sensed by the pressure switch 184, wherein detection of hydraulic fluid pressure indicates the start of hydraulic fluid flow to the cooling circuit 116, which in turn is used to determine the speed of the pump 104 at which point hydraulic fluid flow to the cooling circuit 116 has begun.

It should be appreciated that the plurality of fluid communication lines described above may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system in a transmission, the hydraulic control system comprising:
   a source of pressurized hydraulic fluid for providing a pressurized hydraulic fluid;
   a main line circuit in fluid communication with the source of pressurized hydraulic fluid;
   a regulation valve in fluid communication with the source of pressurized hydraulic fluid, the regulation valve moveable between a plurality of positions;
   a lubrication valve in fluid communication with the regulation valve, the lubrication valve moveable between a plurality of positions;
   a lubrication circuit in fluid communication with the lubrication valve;
   a cooling circuit in fluid communication with the lubrication valve;
   wherein the regulation valve allows pressurized hydraulic fluid to communicate with the lubrication valve after the main line circuit is saturated with pressurized hydraulic fluid, wherein the lubrication valve allows fluid communication between the regulation valve and the lubrication circuit until the lubrication circuit is saturated, and wherein the lubrication valve allows fluid communication between the regulation valve and the cooling circuit and the lubrication circuit after the lubrication circuit is saturated.

2. The hydraulic control system of claim 1 wherein the source of pressurized hydraulic fluid is an electric pump.

3. The hydraulic control system of claim 2 wherein when lubrication circuit is saturated with hydraulic fluid, the flow of the hydraulic fluid to the cooling circuit is controlled by a speed of the electric pump and the flow of the hydraulic fluid to the lubrication circuit is constant and is controlled by the lubrication valve.

4. The hydraulic control system of claim 1 wherein the cooling circuit is in communication with a stator of the transmission.

5. The hydraulic control system of claim 1 wherein the regulation valve allows regulated hydraulic fluid flow to communicate to the source of pressurized hydraulic fluid when the cooling circuit is saturated with hydraulic fluid.

6. The hydraulic control system of claim 1 further comprising a solenoid in operative association with the regulation valve and the lubrication valve, wherein the solenoid is operable to bias the regulation valve to a position that prevents fluid communication between the regulation valve and the lubrication valve, and wherein the solenoid is operable to bias the lubrication valve to a position that allows fluid communication between the regulation valve and the lubrication circuit and prevents fluid communication between the regulation valve and the cooling circuit.

7. The hydraulic control system of claim 6 wherein the regulation valve and the lubrication valve are each biased by a biasing member in the same direction as the solenoid.

8. The hydraulic control system of claim 7 wherein the regulation valve is moved after the main line circuit is saturated by pressurized hydraulic fluid from the source of pressurized hydraulic fluid acting on the regulation valve against the bias of the solenoid and the biasing member.

9. The hydraulic control system of claim 7 wherein the lubrication valve is moved after the lubrication circuit is saturated by pressurized hydraulic fluid acting on the lubrication valve against the bias of the solenoid and the biasing member.

10. A hydraulic control system in a transmission, the hydraulic control system comprising:
a source of pressurized hydraulic fluid for providing a pressurized hydraulic fluid;
a main line circuit in fluid communication with the source of pressurized hydraulic fluid;
a regulation valve in fluid communication with the source of pressurized hydraulic fluid, the regulation valve moveable between a plurality of positions;
a lubrication valve in fluid communication with the regulation valve, the lubrication valve moveable between a plurality of positions;
a lubrication circuit in fluid communication with the lubrication valve;
a cooling circuit in fluid communication with the lubrication valve;
wherein the regulation valve is in a first position when the main line circuit is not fully saturated with hydraulic fluid, and wherein the first position of the regulation valve prevents hydraulic fluid flow from communicating with the lubrication valve;
wherein the regulation is in a second position and the lubrication valve is in a first position when the main line circuit is saturated with hydraulic fluid, and wherein the second position of the regulation valve allows fluid communication from the source of pressurized hydraulic fluid to the lubrication valve and the first position of the lubrication valve allows fluid communication to the lubrication circuit;
wherein the regulation valve is in a second position when the lubrication circuit is saturated with hydraulic fluid, and wherein the second position of the lubrication valve allows regulated hydraulic fluid flow to the cooling circuit; and
wherein the regulation valve is in a third position when feedback pressure from the lubrication circuit moves the regulation valve to the third position, and wherein the third position of the lubrication valve allows hydraulic fluid flow to the cooling circuit and regulated hydraulic fluid flow to the lubrication circuit.

11. The hydraulic control system of claim 10 wherein the source of pressurized hydraulic fluid is an electric pump.

12. The hydraulic control system of claim 11 wherein when the lubrication valve is in the third position, the flow of the hydraulic fluid to the cooling circuit is controlled by a speed of the electric pump and the flow of the hydraulic fluid to the lubrication circuit is constant and is controlled by the lubrication valve.

13. The hydraulic control system of claim 10 wherein the cooling circuit is in communication with a stator of the transmission.

14. The hydraulic control system of claim 10 further comprising a solenoid in operative association with the regulation valve and the lubrication valve, and wherein the solenoid is operable to bias the regulation valve to the first position and the lubrication valve to the first position.

15. The hydraulic control system of claim 10 wherein the regulation valve is in a third position when the cooling circuit is saturated with hydraulic fluid, and wherein the third position of the regulation valve allows regulated hydraulic fluid flow to communicate to the source of pressurized hydraulic fluid.

16. A hydraulic control system for a transmission of a motor vehicle comprising:
a pump for providing a pressurized hydraulic fluid;
a main line circuit in fluid communication with the pump;
a regulation valve assembly having an inlet port and a feedback port in communication with the pump and an outlet port, the regulation valve assembly having a regulation valve moveable between at least a first position, a second position, and a third position, wherein the regulation valve prevents fluid communication between the inlet port and the outlet port when in the first position, the regulation valve allows partial fluid communication between the inlet port and the outlet port when in the second position, and wherein the regulation valve allows for fluid communication between the inlet port and the outlet port when in the third position;
a lubrication valve assembly having an inlet port in communication with the outlet port of the regulation valve assembly, a first outlet port, a second outlet port, and a feedback port, the lubrication valve assembly having a lubrication valve moveable between at least a first position, a second position, and a third position, wherein the lubrication valve allows fluid communication between the inlet port and the first outlet port and prevents fluid communication between the inlet port and the second outlet port when in the first position, the lubrication valve allows fluid communication between the inlet port and the first outlet port and allows partial fluid communication between the inlet port and the second outlet port when in the second position, and the lubrication valve allows partial fluid communication between the inlet port and the first outlet port and allows fluid communication between the inlet port and the second outlet port when in the third position;

a lubrication circuit in fluid communication with the first outlet port of the lubrication valve assembly;

a cooling circuit in fluid communication with the second outlet port of the lubrication valve assembly;

wherein the regulation valve is in the first position and the lubrication valve is in the first position when the main line circuit is not fully saturated with hydraulic fluid;

wherein the regulation valve is moved to the second position when the hydraulic fluid from the pump enters the feedback port and moves the regulation valve to the second position, wherein the regulation valve is moved to the third position when the main line circuit is saturated by hydraulic fluid and the lubrication valve is moved to the second position when the hydraulic fluid from the first outlet port enters the feedback port and moves the lubrication valve to the second position; and wherein the lubrication valve is moved to the third position when the hydraulic fluid from the first outlet port enters the feedback port and moves the lubrication valve to the third position.

17. The hydraulic control system of claim 16 wherein the regulation valve assembly includes a return port in fluid communication with the pump, wherein the regulation valve includes a fourth position wherein the inlet port is in communication with the return port, and wherein the regulation valve is moved to the fourth position when the cooling circuit is saturated by hydraulic fluid.

18. The hydraulic control system of claim 16 further comprising a control device in operative association with the regulation valve and the lubrication valve, and wherein the control device is operable to bias the regulation valve to the first position and the lubrication valve to the first position.

19. The hydraulic control system of claim 16 wherein the lubrication valve is in the second position when the flow of hydraulic fluid to the lubrication circuit remains constant as a flow of hydraulic fluid from the pump increases.

20. The hydraulic control system of claim 19 wherein as the lubrication valve moves from the second position to the third position, the flow of hydraulic fluid to the lubrication circuit remains approximately constant while the flow of hydraulic fluid to the cooling circuit increases as a flow of hydraulic fluid from the pump increases.

* * * * *